INVENTORS.
J. ROGER TOTH &
MICHAEL L. GILLILAND
BY

*Ely & Golrick*

ATTORNEYS

United States Patent Office 3,497,784
Patented Feb. 24, 1970

3,497,784
BRUSHLESS DIRECT CURRENT MOTOR CIRCUITRY AND LIKE CIRCUITRY WITH PROTECTION FOR NON-COMMUTATING CONDITIONS
J. Roger Toth, Macedonia, and Michael L. Gilliland, Kent, Ohio, assignors to Ametek, Inc., a corporation of Delaware
Filed July 10, 1967, Ser. No. 652,286
Int. Cl. H02k 29/00
U.S. Cl. 318—138                                    14 Claims

ABSTRACT OF THE DISCLOSURE

A brushless direct current motor of the type having a a stator, an induction motor type rotor, a center-tapped stator field winding, silicon controlled rectifiers (SCR's) as switching devices and a gating circuit for the SCR's, incorporated in parallel capacitor inverter type circuitry whereby direct current applied to the inverter circuitry results in a rotor-driving alternating magnetic stator field of a frequency substantially determinative of maximum rotor speed; a power rectifier stage including a power SCR connected with anode to a first A.C. input lead and cathode to the winding center tap; a diode, resistor and capacitor in series as an R-C timing branch across the power SCR anode and cathode with a trigger diode from the capacitor to power SCR gate; a rectifying diode and resistor from one end of the stator winding to the power rectifier gate as a feedback rectifier stage from the inverter stage to the power rectifier, and a filter capacitor from the winding center tap to the cathode side of the feedback diode; whereby proper commutation operation in the inverter stage provides a direct current fed back to the power SCR gate to maintain it in conducting state despite alternating current reversal, but upon simultaneous conduction of the inverter SCR's results in zero feedback with turn-off of the power SCR at the end of one-half cycle of the A.C. supply; followed by re-application by the power rectifier of direct current to the inverter stage to attempt proper operation.

---

The present invention relates to brushless electric motor circuitry of the parallel capacitor inverter type and like circuitry with provisions for protection against damage under non-commutating conditions and for more effective starting.

In the prior art there are now known numerous circuits for rotary brushless direct current motors having mechanical-electromagnetic structure basically similar to earlier alternating current motor types, usually induction motor types, wherein field windings, generally on a stator component, form part of oscillator or inverter circuitry with electronic switches whereby direct current energizing the motor is applied in the windings in alternating directions producing an alternating magnetic field driving the rotor. Such motors have been found advantageous, for example, for operation from direct current sources because of their brushless character, or for operation from alternating current sources by inclusion of a rectifier to escape an operating speed limitation otherwise imposed by the source frequency. Parallel capacitor inverter circuitry with SCR's as the switching devices has been found particularly useful in these brushless direct current motors, especially those of higher fractional horsepower and greater ratings.

The possibility of simultaneous conduction of the switching devices, particularly SCR's, upon starting of the motor, or even on re-application of power while the rotor is rotating at fair speed, represents not only a danger of non-starting, or non-operation because of the commutation failure, but also of damage to the SCR's and other components by the continuous high current involved. Hence electromechanical relays or fuses as automatic devices or operator actuated power switches have been proposed to obtain proper starting and for protection of the motor circuitry or the system dependent upon the motor, with several obvious disadvantages attendant.

A general object of the present invention is to provide, in a brushless electric motor or like circuitry involving an inverter incorporating electronic switching devices such as silicon controlled rectifiers, improved circuit means to insure against damage usually consequent upon improper commutation in starting and at other times as well. Another object is to provide circuitry able automatically repeatedly to attempt proper starting of the circuit operation. Other objects and advantages will appear from the following description and the annexed drawing.

Figure 1:
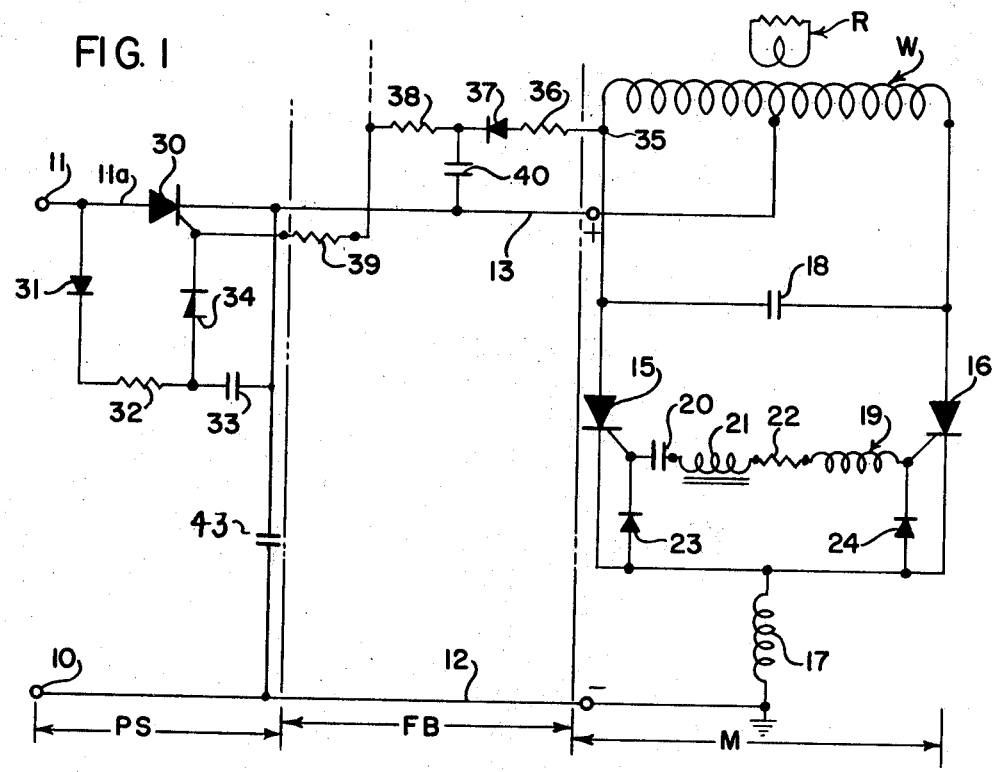
FIG. 1 is a schematic circuit showing the invention as incorporated in a brushless direct current motor energized from an alternating current source.

In the drawing FIG. 1 circuit sections PS, FB and M are shown roughly delimited by the dashed vertical lines; the SCR power rectifier-starting circuit section PS, energized by alternating current power supplied at A.C. input terminals 10, 11 for supplying direct current to the motor circuit parallel capacitor inverter section M of known type, wherein the rotor R appears as a loaded secondary winding to the motor stator winding W as a transformer primary; and the feedback rectifier section FB whereby an A.C. signal produced in M may be rectified to provide a D.C. feedback to control power application from PS to M.

In the motor section M with direct current supplied from lines 12, 13 considered as the positive and negative output leads of PS, the rotor R, which may be an induction motor type rotor, is driven by alternating energization of the two halves of the center-tapped stator winding W by switching action of respective inverter SCR's 15, 16; the winding W conveniently being provided by bifilar winding onto the stator iron lamination stack. The cathodes of these SCR's are commonly connected through inductor 17 to the ground or negative lead 12; the anodes, with commutating capacitor 18 thereacross, to respective ends of the winding W; and the gates to appropriate firing circuitry supplying timed pulses alternately to the gates at a frequency determining the inverter operation frequency and thereby the motor speed maximum. Here for a motor, one of the known configurations for firing circuitry is represented by a stator feedback winding 19, capacitor 20, inductor 21 and resistor 22 connected in a resonant series branch between the gates of 15 and 16, and switching diodes 23, 24 with anodes commonly connected with the cathodes of the SCR's and cathodes to the opposite ends respectively of the resonant branch whereby feedback pulses of alternating polarity are applied as gating pulses to respective SCR gates.

In the motor section M, shown as for a single phase type motor winding though the principles of the invention are applicable in multi-phase types, for drawing clarity there are omitted conventional means to provide a shifting field for starting in a single phase motor, such as a starting winding in series with a phase shifting capacitor across the ends of the winding W, or pole shading coil means. In the power rectifier section PS, to apply an appropriately shaped gating pulse to power SCR 30, with which one or more like SCR's could be paralleled for handling greater current, or which may be one of two SCR's with commonly connected cathodes in a full wave rectifier with anodes connected, for example, to the ends of a center-tapped secondary of an A.C. transformer with center-tap connected to terminal 10, there is an R-C timing branch comprised, in order, of rectifying diode 31, resistor 32 and timing capacitor 33 connected in series from the A.C. input lead 11a on the power rectifier anode to its cathode, and further through power filter capacitor 43 to terminal 10 to provide a charging path, and a PNPN solid state trigger device 34, whereby with application of A.C. power, capacitor 33 charges, but no pulse is applied to the gate until the characteristic trigger voltage of 34 is reached, whereupon the capacitor discharges through the trigger and gate-cathode electrodes of SCR 30 fires the latter to apply power to the input of M.

In the feedback section FB, the resistor 36, feedback rectifier diode 37, and resistors 38, 39 connected in series from the stator winding end on SCR 15 to the gate of power SCR 30, the line 13 from the cathode of the latter to the center tap of W, and filter capacitor 40 between 13 and the cathode side of diode 37 provide a feedback circuit to feed direct current back to the gate of power rectifier 30 for keeping the latter turned on—and so also any other power SCR having a common cathode connection with gate connected usually through a resistor to a point between 38, 39—when the circuit M is in operation with proper commutation. The alternating current feedback here is taken for rectification from across one-half of the winding W as a practical necessity rather than across the secondary, since the latter is a rotating component of the motor.

Direct current power is not supplied to the inverter circuit M by the power rectifier PS immediately upon application of alternating current power at terminals 10, 11, but only after the delay in charging capacitor 33 to the trigger voltage of 34 as determined by the R-C time constant, a few N cycles of the input, at which point SCR 30 is gated on by the discharge of 33 through trigger 34. The gate is thus pulsed every N input cycle in a starting mode supplying a pulsating direct current to M in starting. If then the inverter section begins proper commutation operation, the alternating current thereby generated is sensed as an A.C. signal between point 35 and line 13. This signal is rectified and fed through circuit FB as a direct current signal continually on the gate of power SCR 30 and any SCR's having a common cathode connection therewith, so that a continuous direct current is supplied in a running mode to the inverter section to initiate and continue motor operation, as long as inverter action is generating the alternating current signal.

In the event that both SCR's in the inverter section M should come into conduction at the same time, the voltage at 35 becomes and remains negative with respect to 13 to the extent of the 1 R drop through the winding halves. This results in a zero feedback to the gate of the power rectifier which turns off upon the next reversal of the alternating current supply cycle applying a reverse voltage thereto, so that the inverter SCR's and other components are protected against damage. The power rectifier circuit then resumes the starting mode generation of pulsating direct current attempting to initiate proper inverter action and therewith motor operation.

Figure 2:
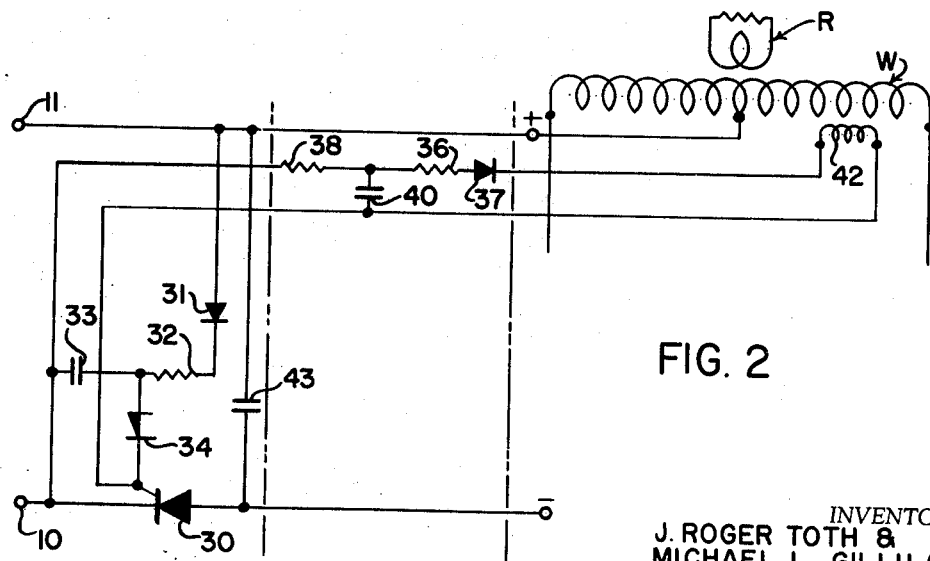
FIG. 2 is a partial schematic representing a modification.

FIG. 2 represents a modification of FIG. 1 wherein the feedback signal source is isolated from direct connection to the input in the inverter circuit, by providing an additional winding 42 inductively coupled with the main inverter or motor winding W in the manner of a transformer; the ends of winding 42 providing the two points in the inverter section from which the A.C. signal is picked up for the feedback rectifier section when and only when inverter operation is occurring to supply the D.C. signal necessary to the power rectifier gate circuitry in order to keep on the power into the inverter.

In FIG. 2 components designated by reference numerals identical to those of FIG. 1 have like function. The circuitry is basically the same, but with the power rectifying SCR 30 being located between the A.C. input terminal 10 and the negative input side of the motor inverter circuit section. However, since in the power supply section the filter capacitor 43 would influence the timing operation of the R-C branch were the diode 31 connected to the anode of SCR 30 as in FIG. 1, here the anode of 31 is connected to the line from A.C. input terminal 11 to avoid such effect.

Though the invention is described above in detail as incorporated in motor circuitry, it appears to have application to a circuit supplied from an alternating current source, rectified to direct current, and, for example, as a static frequency converter, generating an alternating current output at another portion of the circuit only when properly operting; which further is subject to damage or has other untoward result, if direct current power is supplied when the proper alternating current generation is not occurring.

We claim:
1. For a brushless direct current motor having a center-tapped field-producing winding, a direct current input lead to the center tap of said winding and a pair of silicon controlled rectifiers connected between respective ends of the field winding and the second direct current input lead, in an inverter motor circuit generating an alternating magnetic field; circuitry for operating said motor circuit from an alternating current power source with protection against damage from improper simultaneous conduction of the silicon controlled rectifiers, comprising:

a power circuit including a lead from a first A.C. input terminal as a D.C. output lead, an SCR as a power rectifier with anode and cathode connected between a second A.C. input terminal and the other D.C. output lead, said output leads being the direct current input leads of the inverter circuit;

said power circuit also including a trigger circuit for gating the power rectifier on at least once after application of alternating current power to the A.C. input terminals to generate direct current output applied to the motor circuitry;

feedback rectifier circuit means with one side connected from one of two points, between which an alternating current voltage appears when and only when proper commutating operation in the motor inverter circuit is occurring, to the power SCR gate and other side from the second of said two points to the cathode of the power SCR, whereby generation of an alternating current output by motor inverter operation is sensed as an A.C. signal appearing between said two points and rectified and fed back as a continuous direct current gating signal for keeping the power rectifier SCR turned on in an operating mode; and without said inverter operation and feedback, in consequence of simultaneous conduction of both inverter SCR's or conduction by neither, said power rectifier interrupts direct current to the inverter circuit input within one-half cycle of the A.C. input after gating on the power SCR.

2. The circuitry of claim 1, wherein the center-tap and one end of said field-producing winding are taken as said two points whereby generation of an alternating current output by motor inverter operation is sensed across one-half the field winding as said A.C. signal.

3. The circuitry of claim 2, wherein said feedback rectifier branch comprises a rectifying diode and resistance in the feedback path with filter means for smoothing the rectified feedback signal.

4. The circuitry of claim 1, having inductively coupled to said field-producing winding a feedback winding with ends taken as said two points whereby generation of an alternating current output by motor inverter operation is sensed by said feedback winding producing said A.C. signal with isolation of the feedback circuit from the D.C. input to the inverter circuit.

5. The circuitry of claim 1, for starting and operating said motor wherein said trigger circuit in said power circuit comprises: as an R-C timing branch connected across the A.C. input terminals a rectifying diode and a resistor and a timing capacitor in series with one side of the capacitor to the power SCR cathode; and a PNPN type trigger from the other and resistor side of the capacitor to the gate of the power SCR whereby the capacitor may periodically discharge gating pulses through the gate-cathode electrodes of the power SCR to gate on the latter intermittently and generate a pulsating direct current output applied to the motor circuitry in a starting mode when no continuous gating signal is being fed back to the power rectifier.

6. The circuitry of claim 5, wherein said power SCR is located in the power circuit with cathode connected to one A.C. input terminal and anode to the negative output lead; and wherein said circuitry includes a filter capacitor between the negative and the positive output leads, and the anode of said rectifying diode is connected to the other A.C. input terminal.

7. The circuitry of claim 2, for starting and operating said motor wherein said power SCR is located in the power circuit with anode connected to one A.C. input terminal and cathode to the positive output lead; and said trigger circuit in said power circuit comprises, as an R-C timing branch connected across the said A.C. input terminals a rectifying diode and a resistor and a timing capacitor in series, with one side of the capacitor to the power SCR cathode, and a PNPN type trigger from the other and resistor side of the capacitor to the gate of the power SCR whereby the capacitor may periodically discharge gating pulses through the gate-cathode electrodes of the power SCR to gate on the latter intermittently and generate a pulsating direct current output applied to the motor circuitry in a starting mode when no continuous gating signal is being fed back to the power rectifier.

8. For circuitry wherein by a power circuit alternating current input is rectified to direct current and supplied as input to a converter circuit generating an alternating current output of different frequency than the alternating current input, said converter circuit subject to damage by application of continuous direct current power when not operating to produce an alternating current output, a circuitry improvement affording protection against such application comprising:

said power circuit including a lead from a first A.C. input terminal as a D.C. output lead, an SCR as a power rectifier with anode and cathode connected between a second A.C. input terminal and the other D.C. output lead, said output leads being the direct curent input leads of the converter circuit;

said power circuit also including a trigger circuit to gate the power rectifier on at least once after application of alternating current power to the A.C. input terminals to generate direct current output applied to the converter circuit;

feedback rectifier circuit means with one side connected from one of two points, between which an alternating current voltage appears when and only when A.C. generating operation in the converter circuit is occurring, to the power SCR gate and other side from the second of said two points to the cathode of the power SCR, whereby generation of an alternating current output by converter operation is sensed as an A.C. signal appearing between said two points and rectified and fed back as a continuous direct current gating signal for keeping the power rectifier turned on in an operating mode; and without said converter operation and feedback, said power rectifier interrupts direct current to the converter circuit input within one-half cycle of the A.C. input after gating on the power SCR.

9. The circuitry improvement described in claim 8, for use where the converter circuit includes a center-tapped winding, a direct current input lead to the center-tap of said winding from said power circuit, and a pair of silicon controlled rectifiers connected between respective ends of the winding and the second direct current input lead from said power circuit in parallel capacitor inverter configuration, and wherein the center-tap and one end of said winding are taken as said two points whereby generation of an alternating current output by inverter operation is sensed across one-half of the said winding as said A.C. signal.

10. The circuitry of claim 9 wherein said feedback rectifier branch comprises a rectifying diode in the feedback path and filter means for smoothing the rectified feedback signal.

11. The circuitry improvement described in claim 8, for use where the converter circuit includes a center-tapped winding, a direct current input lead to the center-tap of said winding from said power circuit, and a pair of silicon controlled rectifiers connected between respective ends of the winding and the second direct current input lead from said power circuit in a parallel capacitor inverter configuration, and having inductively coupled to said center-tapped winding a feedback winding with ends taken as said two points whereby generation of an alternating current output by converter operation is sensed by said feedback winding producing said A.C. signal with isolation of the feedback circuit from the D.C. input of the converter circuit.

12. The circuitry of claim 8, for starting and operating said converter circuit wherein said trigger circuit in said power circuit comprises as an R-C timing branch, a rectifying diode with anode connected to a point in the current path from one said A.C. input terminal to the power SCR, a resistor, and capacitor in series, with one side of the capacitor to the power SCR cathode; and a PNPN type trigger from the other and resistor side of the capacitor to the gate of the power SCR whereby the capacitor may periodically discharge gating pulses through the gate-cathode electrodes of the power SCR to gate on the latter intermittently and generate a pulsating direct current output applied to the converter circuit in a starting mode when no continuous gating signal is being fed back to the power rectifier.

13. The circuitry of claim 8, for starting and operating said converter circuit wherein the power SCR anode is connected to the said second A.C. input terminal; wherein said trigger circuit in said power circuit comprises, as an R-C timing branch, a rectifying diode with anode connected to the said second A.C. input terminal, a resistor, and capacitor in series between the second input terminal and power SCR cathode; and a PNPN type trigger from the resistor side of the capacitor to the gate of the power SCR whereby the capacitor may periodically discharge gating pulses through the gate-cathode electrodes of the power SCR to gate on the latter intermittently and generate a pulsating direct current output applied to the converter circuitry in a starting mode when no continuous gating signal is being fed back to the power rectifier.

14. The circuitry of claim 12, wherein said power SCR is located in the power circuit with cathode connected to one A.C. input terminal and anode to the negative output lead and includes a filter capacitor between the negative and the positive output leads, and the anode of said rectifying diode is connected to the other A.C. input terminal.

References Cited

UNITED STATES PATENTS

| | | | |
|---|---|---|---|
| 3,273,041 | 9/1966 | Strohmeier et al. | 321—4 |
| 3,360,710 | 12/1967 | Barthold et al. | |
| 3,364,408 | 1/1968 | Katz et al. | 318—227 XR |
| 3,365,636 | 1/1968 | Baker | 318—138 |
| 3,394,299 | 7/1968 | Lawn et al. | 321—11 |
| 3,401,327 | 9/1968 | Leppert | 321—11 |

ORIS L. RADER, Primary Examiner

G. RUBINSON, Assistant Examiner

U.S. Cl. X.R.

318—227, 254; 321—4, 11